United States Patent
Klein et al.

(10) Patent No.: US 6,272,860 B1
(45) Date of Patent: Aug. 14, 2001

(54) METHOD AND APPARATUS FOR CHECKING THE FUNCTIONING OF A PRESSURE-OPERATED ACTUATING ELEMENT IN AN INTERNAL COMBUSTION ENGINE

(75) Inventors: Rudolf Klein, Weinstadt; Harald Brösecke, Stuttgart, both of (DE)

(73) Assignee: DaimlerChrysler AG (DE)

(*) Notice: Subject to any disclaimer, the term of this patent is extended or adjusted under 35 U.S.C. 154(b) by 0 days.

(21) Appl. No.: 09/356,753

(22) Filed: Jul. 19, 1999

(30) Foreign Application Priority Data

Jul. 23, 1998 (DE) .............................. 198 33 148

(51) Int. Cl.$^7$ .................................. F02D 23/00
(52) U.S. Cl. ............................................. 60/602
(58) Field of Search ................................. 60/602

(56) References Cited

U.S. PATENT DOCUMENTS

| 4,437,311 | * | 3/1984 | Iwamoto et al. | .............. | 60/602 |
| 4,612,770 | * | 9/1986 | Tadokoro et al. | .............. | 60/602 |
| 4,763,474 | * | 8/1988 | Franklin | .............. | 60/602 |
| 5,289,683 | * | 3/1994 | Kurihara | .............. | 60/602 |
| 6,018,949 | * | 2/2000 | Brosecke et al. | .............. | 60/602 |

FOREIGN PATENT DOCUMENTS

| 33 06 484 A1 | 11/1983 | (DE) . |
| 42 25 361 A1 | 2/1994 | (DE) . |
| 2319828 | 6/1998 | (EP) . |
| 358195023A | * 11/1983 | (JP) ............... 60/602 |
| 1-32019 | 2/1989 | (JP) . |

* cited by examiner

Primary Examiner—Thomas Denion
Assistant Examiner—Thai-Ba Trieu
(74) Attorney, Agent, or Firm—Mark P. Calcaterra

(57) ABSTRACT

In a method for early diagnosis of malfunctions of emission-improving measures, a pressure-operated actuating element is provided in an internal combustion engine, and this actuating element opens and closes as a function of an actuating pressure supplied a bypass passage that bypasses the turbine of an exhaust turbocharger, the actuating element being supplied with a diagnosis pressure as the actuating pressure to check its operation, and a fault signal being generated if the actual value of the intake pressure that establishes itself in the intake manifold of the internal combustion engine differs from a target value for the intake pressure.

15 Claims, 2 Drawing Sheets

METHOD AND APPARATUS FOR CHECKING THE FUNCTIONING OF A PRESSURE-OPERATED ACTUATING ELEMENT IN AN INTERNAL COMBUSTION ENGINE

BACKGROUND OF THE INVENTION

1. Field of the Invention

The invention relates to a method and an apparatus for checking the functioning of a pressure-operated actuating element in an internal combustion engine.

2. Related Art

DE 33 06 484 A1 discloses an internal combustion engine with an exhaust turbocharger, the turbine of which, which is located in the exhaust line of the internal combustion engine, drives a compressor arranged in the intake duct for the purpose of increasing the intake pressure. To heat an exhaust catalyst mounted in the exhaust line downstream of the turbine to its operating temperature as quickly as possible, the turbine can be bypassed by means of a bypass passage which can be opened and closed by a pressure-dependent actuator. When the bypass passage is open, some of the hot exhaust gasses flow directly to the catalyst, bypassing the turbine, and heat it quickly to its operating temperature, thereby reducing pollutant emissions after a cold start.

The actuator that opens and closes the bypass passage comprises a spring-loaded diaphragm in a housing with a pressure chamber supplied via a pressure line. If the pressure chamber is subjected to the reduced pressure that prevails, for example, in the intake manifold at idle when the internal combustion engine is started, the diaphragm and an actuating rod connected to the diaphragm are displaced, the bypass passage thereby being opened and the exhaust gas passed directly to the catalyst.

In the event of a leak in the pressure line that supplies the pressure chamber of the actuator, the pressure chamber is not supplied with the reduced pressure required to open the bypass passage but, instead, is subjected to ambient pressure, with the result that the bypass passage remains closed and the useful exergy of the exhaust gas is used to drive the turbine but not to heat the catalyst directly. If the catalyst is below its operating temperature, larger quantities of unpurified exhaust gas are then emitted.

SUMMARY OF THE INVENTION

The object on which the invention is based is to diagnose malfunctions of emission-improving measures at an early stage.

According to the method of the invention, it is possible to perform a check on the ability to function of the actuating element and the lines supplying the actuating element and branching off from it. In the diagnostic test, the actuating element is supplied with a diagnosis pressure that results in a particular setting of the actuating element which affects the cross section of the bypass passage, with the result that a particular quantity of exhaust gas flows through the bypass passage and the remainder of the exhaust-gas flow serves to drive the turbine. The flow of exhaust gas through the turbine can be assigned an intake-pressure target value or a known target-value curve; if the measured actual intake-pressure value deviates from the target value, a fault signal is generated, indicating that the actuating element or a component associated with the actuating element is malfunctioning.

This method has the advantage that it is suitable for diagnosing many different actuating elements that can be set by means of pressure. The method can be carried out at regular intervals in different or identical engine operating conditions. Depending on the type of actuating element and the operating condition, supplying diagnosis pressure when the system is functioning correctly can lead to a change in the pressure in the intake duct or an approximately constant pressure curve for the intake pressure. If the actual intake pressure deviates from the target value, a fault signal is generated.

According to an expedient development, the actuating element is moved in the direction of the open position if the actuating pressure within the pressure chamber drops and in the direction of the closed position if the pressure rises. In a first preferred embodiment, the actuating element is supplied in boost mode with increased intake pressure as the diagnosis pressure, and this leads to the closure of the actuating element and consequently to an increase in the mass flow of exhaust gas through the turbine as the intake pressure rises. If the increasing intake pressure reaches a particular pressure value, the actuating element is functioning correctly. If the pressure value is not reached, there is a fault, and a fault signal is generated.

In a second preferred embodiment, the actuating element is designed in such a way that, at a given standard pressure—generally ambient pressure—the bypass passage is closed and, at an actuating pressure above or below the standard pressure, the bypass passage is opened. If the system is functioning correctly, the actuating element is supplied with the intake pressure at idle, particularly just after the internal combustion engine has started, and at this pressure the actuating element remains in the open position due to the vacuum at idle, with the result that a constant flow of exhaust gas flows through the turbine and the pressure profile in the intake duct remains essentially the same. In the event of a fault—a leaking line—on the other hand, the actuating element is supplied with the higher ambient pressure, which moves the actuating element into the closed position, with the result that the turbine is supplied with a higher mass flow of exhaust gas and the intake pressure rises owing to the higher compressor output. The rise is diagnosed and leads to a fault signal.

In the second embodiment, diagnostic testing can also be carried out when the internal combustion engine is in boost mode by supplying the actuating element with the intake pressure $p_{2S}$ as the diagnosis pressure, this pressure lying above the standard pressure but below $p_2$, with the result that the actuating element is for a brief period moved further into the open position than by the boost-pressure control system. The quantity of exhaust gas flowing through the turbine decreases slightly and, accordingly, the boost pressure falls slightly. In the event of a fault, the actuating element is subjected to ambient pressure and is thus displaced into the closed position, as a result of which the output of the turbocharger and hence also the boost pressure is increased, this being used to generate a fault signal.

There is another diagnosis option with the use of a secondary air pump that can be used to introduce secondary air directly downstream of the engine exhaust valves in order to initiate an exothermic secondary reaction involving the exhaust pollutants. A switching valve supplied with the intake pressure as the switching pressure is provided for controlling the secondary air. In normal operation, the switching valve opens if there is a vacuum in the intake manifold, whereupon secondary air is injected. In the case of diagnosis, the oxygen concentration in the exhaust line is measured and compared with a target value. If there is a leak, the pressure in the switching valve rises and the valve is then moved into the closed position, reducing or shutting off the supply of secondary air. In the event of a fault, the actual oxygen concentration is below the target value, whereupon a fault signal is generated.

The apparatus according to the invention has an actuating element in an internal combustion engine with an exhaust turbocharger, the turbine of which can be bypassed in the exhaust line by a bypass passage. The bypass passage is opened or shut off by the actuating element, the actuating element being in the open position when a reduced pressure is applied and in the closed position when the standard pressure is applied. The actuating element is connected to the intake duct by a pressure line. Arranged in the pressure line is a nonreturn valve which opens towards the intake duct and via which reduced pressure can be transmitted from the intake duct to the actuating element. The reduced pressure moves the actuating element into the open position in the normal operating mode.

Arranged in parallel with the nonreturn valve is a diagnosis valve which can be activated by means of an actuating signal from an engine management system and bypasses the nonreturn valve. During the function check, the diagnosis valve is activated, allowing the intake pressure in the intake duct to be supplied directly to the actuating element via the diagnosis valve, bypassing the nonreturn valve. The intake pressure is used as the diagnosis pressure in a manner dependent on the type of actuating element used and the engine operating condition and causes a particular reaction of the actuating element with the concomitant setting of the intake pressure. The intake pressure is measured and compared in the engine management system with a target value; in the case of an impermissible deviation of the actual value from the target value, the engine management system produces a fault signal.

It is expedient if, downstream of the nonreturn valve and the diagnosis valve, there is a switching valve that can be switched in such a way that either the actuating element is connected to the intake duct or is subjected to ambient pressure. For diagnostic purposes, the switching valve is switched to the position in which it connects the actuating element to the intake duct. Switching is advantageously performed by the engine management system, which decides to carry out a function check by evaluating the operating parameters recorded.

It is advantageous if the actuating element is designed as a pressure cell with an actuating diaphragm that delimits a pressure chamber. The actuating diaphragm acts on an actuating rod that moves a valve or the like between a closed position, in which it shuts off the bypass passage, and an open position, in which it opens the bypass passage. The pressure cell does not require any additional actuating energy but uses differences in pressure in the internal combustion engine to achieve the desired setting of the flow cross section in the bypass passage.

The pressure cell can be designed as a single-chamber pressure cell or as a two-chamber pressure cell. In addition to the pressure chamber, the two-chamber pressure cell has a reference chamber, the reference chamber being supplied with the intake pressure upstream of a charge-air cooler in the intake duct and the pressure chamber being supplied with the intake pressure in the intake manifold downstream of the throttle valve. In the case of diagnosis—in boost mode—the pressure chamber of the two-chamber pressure cell is supplied with the increased intake pressure, and the pressure cell is moved into the closed position, leading to an increase in turbine output and a further rise in the intake pressure unless there are incorrect air flows due to leaks.

The pressure chamber of the single-chamber pressure cell can be connected by a switching valve either to the intake pressure upstream of the charge-air cooler or that downstream of the throttle valve. During the function check, the intake pressure downstream of the throttle valve is connected to the pressure cell, the nonreturn valve in the feed line being bypassed by means of the diagnosis valve. The engine management system detects a fault if the intake pressure assumes an impermissibly high value.

The methods described and the apparatus allow on-board diagnosis of the engine components that affect exhaust emissions while the engine is in operation.

BRIEF DESCRIPTION OF THE DRAWINGS

Further advantages and-expedient embodiments can be found in the other claims, the description of the figures and the drawings, in which:

DESCRIPTION OF THE PREFERRED EMBODIMENTS

Figure 1:
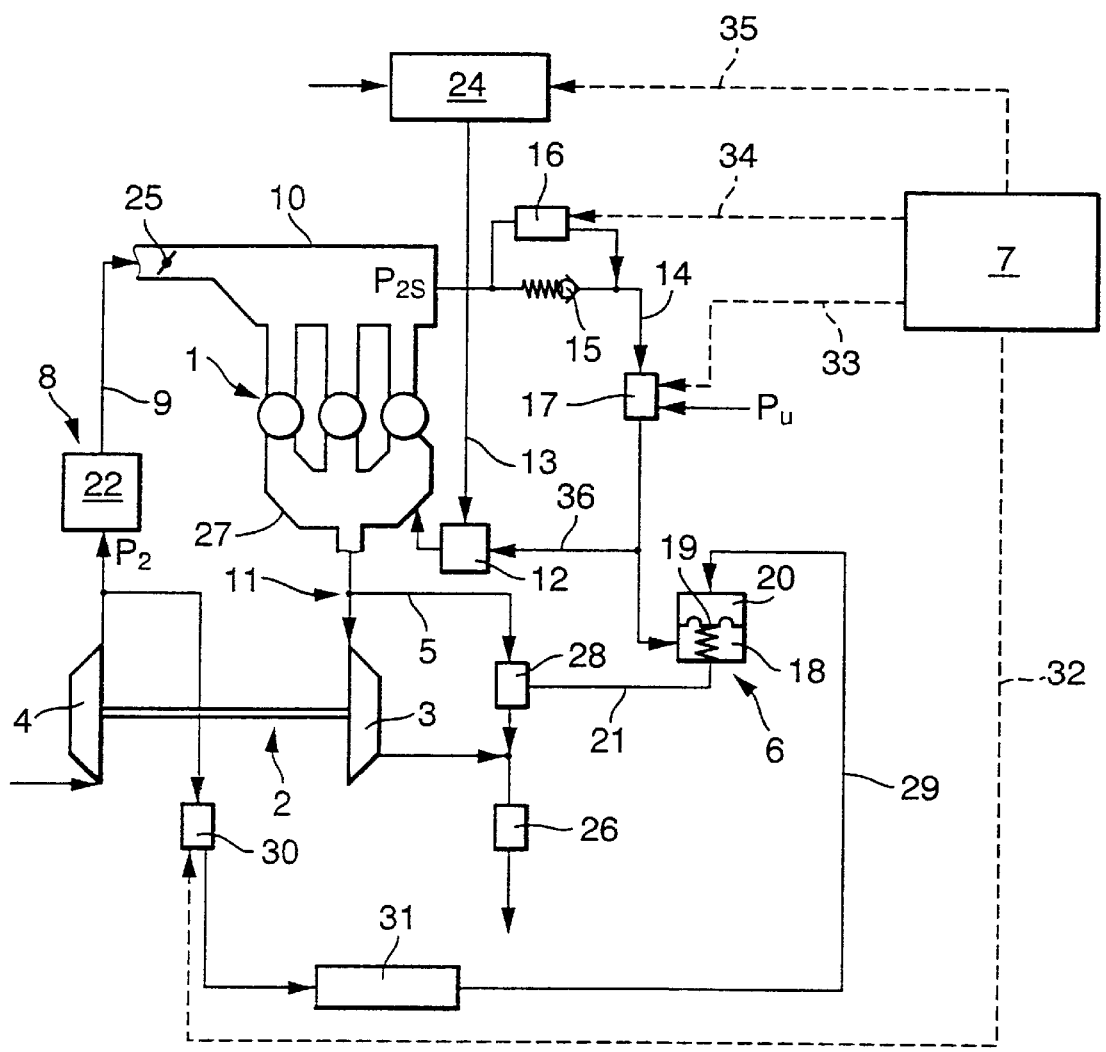
FIG. 1 shows a diagrammatic representation of an internal combustion engine with an exhaust turbocharger and an actuating element for supplying a bypass passage around the turbine.

The internal combustion engine 1 shown in FIG. 1 is provided with an exhaust turbocharger 2, the turbine 3 of which is driven in the exhaust line 11 by the exhaust gases of the internal combustion engine 1, the compressor 4 in the intake duct 8 being driven by the turbine and compressing intake air to the intake pressure $P_2$. Downstream of the compressor 4, the intake air is first cooled in a charge-air cooler 22 and is then fed via a collecting air line 9 to an intake manifold 10, in which a throttle valve 25 is located. The pressure prevailing in the intake manifold 10 is the intake pressure $p_{2,S}$, the value of which is below the value of the intake pressure upstream of the throttle valve 25 when the internal combustion engine 1 is idling and the throttle valve 25 is substantially closed. Via the intake manifold 10, the intake air is fed to intake passages that open into the cylinder inlets of the internal combustion engine 1.

The exhaust gas from the internal combustion engine 1 is first of all collected, in the region of the cylinder outlets, in an exhaust-gas collector 27 and then fed to the exhaust line 11, at the end of which, downstream of the turbine 3, there is a catalytic converter 26 for the catalytic conversion of noxious exhaust emissions. To heat the catalytic converter 26 to its operating temperature as quickly as possible after cold-starting of the internal combustion engine 1, the turbine 3 of the exhaust turbocharger 2 can be bypassed by means of a bypass passage 5, the exhaust gas thus being carried directly to the catalytic converter 26 and heating it, bypassing the turbine 3. The bypass passage 5 can be opened and closed as a function of the operating condition of the internal combustion engine by means of a bypass valve 28 which is operated by means of an actuating rod 21 of an actuating element 6.

In the embodiment example shown in FIG. 1, the actuating element 6 is embodied as a two-chamber pressure cell with a pressure chamber 18, an actuating diaphragm 19 connected to the actuating rod 21 and a reference chamber 20. The actuating diaphragm 19 is displaced axially between the pressure chamber and the reference chamber depending on the prevailing pressure conditions in the pressure chamber 18 and the reference chamber 20, as a result of which the actuating rod is also moved and the bypass valve 28 is moved into the open position or the closed position. When there is reduced pressure in the pressure chamber 18, the bypass valve 28 is opened while, when there is excess pressure in the pressure chamber 18, it is closed.

The reference chamber 20 of the actuating element 6 is supplied via a pressure line 29 with the intake pressure $p_2$ downstream of the compressor 4 but upstream of the charge-air cooler 22. In the pressure line 29 there is a cyclically operated valve 30 for the cyclical transmission of the intake pressure $p_2$ and a damping volume 31 for smoothing out pressure peaks. The cyclically operated valve 30 is controlled by the engine management system 7 of the vehicle by way of a signal line 32.

The pressure chamber 18 of the actuating element 6 is connected to the intake manifold 10 by a pressure line 14. In the pressure line 14 is a nonreturn valve 15 which transmits the vacuum from the intake manifold 10 to the pressure chamber 18 of the actuating element 6, and a switching valve 17 controlled by the engine management system 7 by way of a signal line 33.

To reduce emissions, the switching valve 17, which is preferably electromagnetic, can be switched to open the pressure line 14 by the engine management system 7 after starting, thus connecting the intake pressure $p_{2S}$, which assumes a reduced-pressure value at idle, to the pressure chamber 18 via the nonreturn valve 15. The actuating element 6 is then moved into the open position and the actuating rod 21 of the actuating element 6 opens the bypass valve 28, with the result that the exhaust gas is carried directly to the catalytic converter 26 via the bypass passage 5 and heats it up.

Once the catalytic converter has reached its operating temperature, the switching valve 17 is closed by the engine management system 7, and ambient pressure $p_u$ is connected to the pressure chamber 18 of the actuating element 6. In this operating mode, the bypass valve 28 can be adjusted in such a way by means of the reference chamber 20 of the actuating element 6, the said reference chamber 20 being supplied via the pressure line 29 with the intake pressure $p_2$ upstream of the charge-air cooler 22, that a certain amount of exhaust gas flows through the bypass passage 5 in accordance with the position of the open bypass valve 28, thereby allowing a desired intake pressure $p_{2S}$ to be set in a controlled manner in the intake manifold 10.

To check its operation, the actuating element 6 can be subjected to diagnosis for the purpose of detecting any malfunctions of the actuating element or one of the pressure lines of the actuating element. For this purpose, a diagnosis valve 16 which bypasses the nonreturn valve 15 in pressure line 14 is activated by the engine management system 7 by way of a signal line 34 while the engine is in the turbocharged mode and, as a result, the intake pressure $p_{2S}$ in the intake manifold 10, which assumes an increased-pressure value in the turbocharged mode, is connected to the pressure chamber 18 as a diagnosis pressure $p_D$ via the diagnosis valve 16 and the switching valve 17, which is set to the opening position.

If the system is functioning correctly, connecting excess pressure to the pressure chamber 18 closes the bypass valve 28, whereupon the entire flow of exhaust gas passes through the turbine 3 and, as a consequence, the turbine output is increased. The increased output of the compressor then leads to a higher intake pressure $p_{2S}$ in the intake manifold 10, and this can be detected by sensors and evaluated in the engine management system 7.

In the event of a malfunction, for example a leak in the actuating element 6 or one of the pressure lines, the pressure level in the intake manifold 10 is not transmitted to the pressure chamber 18 and the bypass valve 28 does not respond. The flow of exhaust gas through the turbine cannot be increased and a higher turbine output and consequently an increase in the intake pressure $p_{2S}$ in the intake manifold 10 cannot be achieved. The difference between the actual value of the intake pressure achieved and the desired target value for the intake pressure is determined in a comparison device belonging to the engine management system 7, whereupon a fault signal is generated.

The malfunctions that can be detected include leaks in pressure line 14 and malfunctions of the actuating element 6, for example defects in the actuating diaphragm 19 or mechanical damage to the actuating rod 21 leading to the bypass valve 28. It is also possible to detect whether the switching valve 17 is switching between the open position for transmitting the intake pressure $p_{2S}$ from the intake manifold 10 and the position for transmitting the ambient pressure $p_u$ to the actuating element 6.

Another facility that is provided is a secondary air pump 24 by means of which secondary air can be fed in directly downstream of the engine exhaust valves to initiate an exothermic secondary reaction to reduce exhaust pollutants, in particular HC and CO. The exothermic secondary reaction significantly increases the temperature of the stream of exhaust gas, allowing the catalytic converter 26 to reach its operating temperature more quickly. The increase in the oxygen content due to the injection of air can be measured by means of an oxygen sensor arranged upstream of the catalytic converter.

The secondary air pump 24, which is controlled by the engine management system 7 via a signal line 35, is connected to the exhaust-gas collector 27 by a supplementary air line 13. Arranged in the supplementary air line 13 is a switching valve 12 by means of which the supplementary air line 13 can be opened or shut off. The switching valve 12 communicates via a control line 36 with the pressure line 14 between the intake manifold 10 and the actuating element 6 and is operated by means of the intake pressure $p_{2S}$. If the intake pressure $p_{2S}$ assumes a reduced-pressure value, the switching valve 12 can be opened.

If the secondary air pump 24 is malfunctioning, it is not possible to detect a rise in the oxygen content, and this leads to the generation of a fault signal. One malfunction is when the hose of the supplementary air line 13 between the secondary air pump 24 and the exhaust-gas collector 27 becomes detached. A fault is also entered if the hose of the pressure line 14 between the intake manifold 10 and the actuating element 6 or that of the control line 36 becomes detached since, in this case, it is no longer possible for the reduced pressure required to open the switching valve 12 to be transmitted. As a result, only a reduced quantity of fresh air or none at all is delivered to the region of the engine exhaust valves and the expected rise in the oxygen content cannot be achieved.

Figure 2:
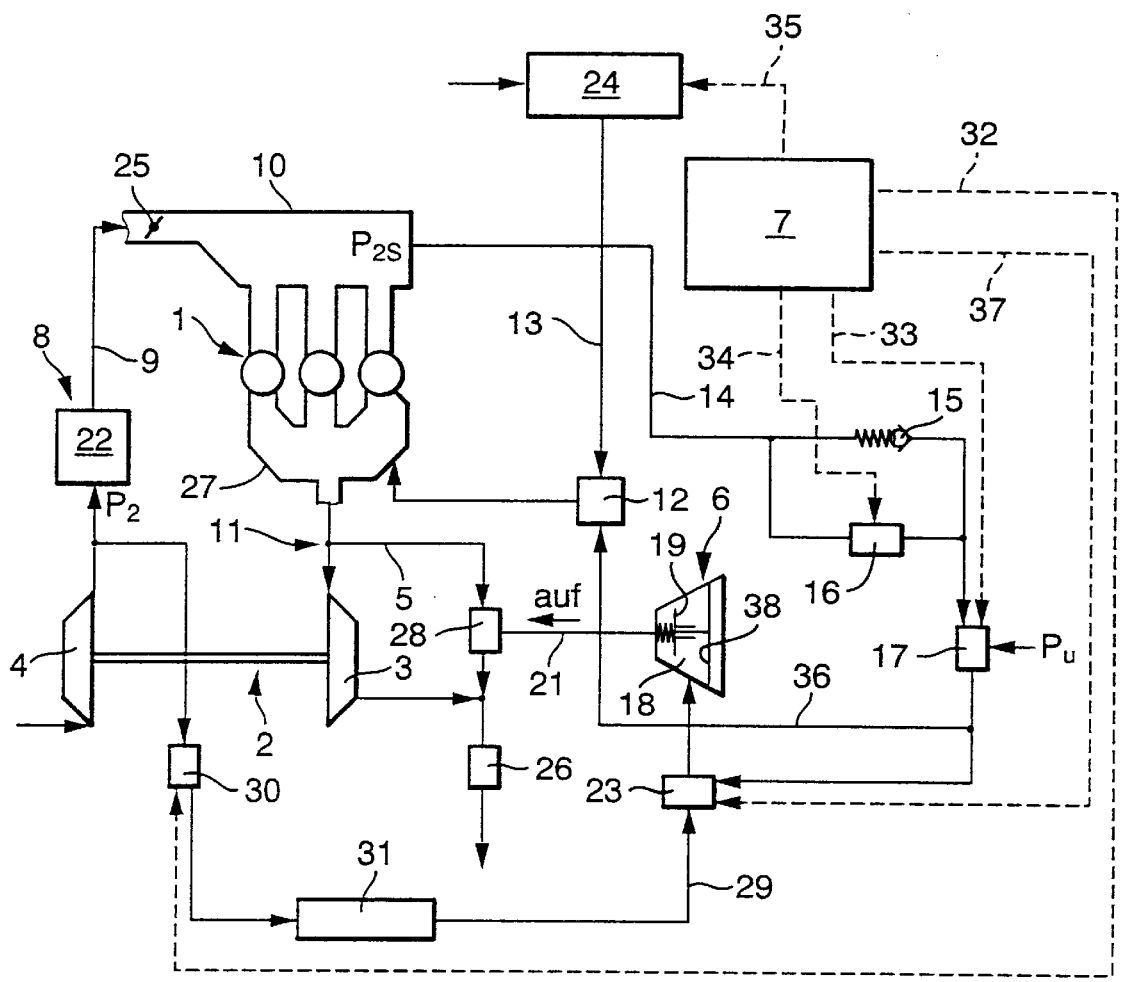
FIG. 2 shows an illustration corresponding to FIG. 1 but with a different embodiment of an actuating element.

FIG. 2 shows another embodiment example, with identical components being denoted by the same reference numerals as in FIG. 1. The way in which the components operate, including the actuating element 6 and the secondary air pump 24, in normal driving mode is identical with the way in which they operate in the embodiment example shown in FIG. 1, to the description of which attention is drawn.

Unlike FIG. 1, the actuating element 6 is designed as a single-chamber pressure cell with a conically shaped pressure chamber 18. In the pressure chamber 18 there are two actuating diaphragms 19 and 38, the first actuating diaphragm 19 being arranged at the conically tapered end of the pressure chamber 18 and being connected to the actuating rod 21 for the purpose of opening and closing the bypass valve 28. The second actuating diaphragm 38, at the wide end of the pressure chamber 18, can transmit an actuating movement towards the first actuating diaphragm 19 by way of a loose rod but cannot transmit such a movement in the opposite direction. At a given standard pressure, which is generally the ambient pressure $p_u$, the actuating element 6 is in a closed position, in which it shuts off the bypass passage 5. Given an excess pressure in the pressure chamber 18, the actuating diaphragms 19 and 38 are forced apart, only the movement of the first actuating diaphragm 19 being transmitted to the bypass valve 28 as an opening movement and displacing the latter in the direction of the open position.

In the case of a vacuum in the pressure chamber 18, the actuating diaphragms 19, 38 move towards one another, with actuating diaphragm 38 executing a larger actuating movement compared with actuating diaphragm 19, owing to its larger surface area. This actuating movement is transmitted to the actuating rod 21 and likewise leads to the opening of the bypass valve 28. Both a reduced pressure below the standard pressure of the actuating element 6 and a reduced pressure above the standard pressure lead to the opening of the bypass passage 5.

The pressure chamber 18 can be supplied either with the intake pressure $p_2$ upstream of the charge-air cooler 22, via pressure line 29, or with the intake pressure $p_{2S}$ in the intake manifold 10, via pressure line 14. A switching valve 23 operated by the engine management system 7 via a signal line 37 allows the system to be switched between boost pressure $p_2$ and boost pressure $p_{2S}$.

In the period following starting, the intake pressure $p_{2S}$ prevailing in the intake manifold at idle, which assumes a subatmospheric value, is transmitted via reduced-pressure pressure line 14, nonreturn valve 15 and the opened switching valves 17 and 23 to the pressure chamber 18 of the actuating element 6. The vacuum in the pressure chamber 18 leads to the bypass valve 28 being opened and the exhaust gas from the engine being fed directly to the catalytic converter 26 via the bypass passage 5. Once the operating temperature has been reached, the switching valve 23 can be switched in such a way that the intake pressure $p_2$ upstream of the charge-air cooler 22 is transmitted to the pressure chamber 18 via the pressure line with the cyclically operated valve 30 and the damping volume 31 for the controlled setting of a desired intake pressure in the intake manifold 10.

During the diagnostic testing of the actuating element 6, a diagnosis pressure is applied to the pressure chamber 18 and the actual value of the intake pressure in the intake manifold is compared with a target intake-pressure value. Either the intake pressure at idle or the intake pressure in boost mode—the boost pressure—in the intake manifold can be used as the diagnosis pressure $p_D$. During diagnostic testing, the diagnosis valve 16 is activated by the engine management system 7 via signal line 34, and the nonreturn valve 15 is thus bypassed.

If the intake pressure $p_{2S}$ at idle is used as the diagnosis pressure $p_D$, then, if the actuating element 6 is functioning correctly, it must remain in the open position, allowing an essentially constant quantity of exhaust gas to flow through the bypass passage 5, and the intake pressure must change only slightly, if at all, owing to the constant output of the compressor. In the case of a malfunction, a leak in one of the pressure lines leading to the actuating element 6 for example, the pressure in the pressure chamber 18 rises and the bypass valve 28 is moved into the closed position. The resulting increase in compressor output ensures that the intake pressure in the intake manifold 10 rises. If the increase exceeds a permitted tolerance value, a fault signal is generated.

If the intake pressure $p_{2S}$ in boost mode is used as the diagnosis pressure $p_D$, the pressure supply to the pressure chamber 18 is merely switched from pressure line 29 to pressure line 14 by means of the switching valve 23. Since, when the throttle valve 25 is open, the intake pressure $P_2$ upstream of the charge-air cooler and the intake pressure $p_{2S}$ in the intake manifold differ only by the amount of the slight pressure loss in the charge-air cooler 22, then, if the system is functioning correctly, the position of the actuating diaphragm 19 in the pressure chamber 18 must change only slightly and the intake pressure in the intake manifold must remain approximately constant. In the event of a leak, in contrast, the pressure in the pressure chamber 18 drops to ambient pressure and the actuating element 6 is moved into the closed position, giving rise to an impermissibly high pressure rise in the intake manifold 10, which can be detected and used to generate a fault signal.

Diagnostic testing of the secondary air pump 24 is performed in a manner similar to that for the embodiment example shown in FIG. 1.

We claim:

1. A method for checking the functioning of a pressure-operated actuating element in an internal combustion engine, the actuating element being designed as a switching valve (12) and opening and closing as a function of an actuating pressure supplied a bypass passage (5) that bypasses the turbine (3) of an exhaust turbocharger (2), a supplementary air line (13) for introducing secondary air directly downstream of the engine exhaust valves which is opened and closed as a function of the intake pressure ($p_{2S}$), the actuating element (6) being supplied with a diagnosis pressure ($p_D$) as an actuating pressure and a fault signal being generated if the actual value of the intake pressure ($p_{2S}$) that establishes itself in the intake manifold (10) of the internal combustion engine (1) differs from a target value for the intake pressure ($p_{2S}$), wherein a fault signal is generated in response to measurement of the oxygen concentration in the exhaust line (11) when the value of the oxygen concentration differs from a target value.

2. The method as set forth in claim 1, wherein the switching valve (12) opens the supplementary air line (13) at reduced pressure.

3. The method as set forth in claim 1, wherein the fault signal is generated when the oxygen concentration value is below the target value.

4. The method as set forth in claim 1 for the internal combustion engine with an exhaust turbocharger having a turbine portion (3) and with a bypass passage (5) about the turbine portion, and an actuating element (6) controlled to open and close the bypass as a function of an actuating pressure applied thereto, the actuating element (6) communicated with intake duct (8) and a nonreturn valve (15) that opens into the intake duct (8) being arranged in the pressure line (14) for the purpose of transmitting reduced pressure, and with an engine management unit (7) for controlling the supply of pressure to the actuating element (6), wherein the functioning of the actuating element (6) is checked by means of a diagnosis valve (16) which bypasses the nonreturn valve (15), transmits the intake pressure ($p_{2S}$) in the intake duct (8) in the direction of the actuating element (6) and can be activated by means of an actuating signal from the engine management system (7), it being possible for an actual signal corresponding to the actual value of the intake pressure ($p_{2s}$) to be compared with a target signal corresponding to a target value for the intake pressure ($p_{2s}$) in a comparison device of the engine management unit (7), and it being possible for a fault signal to be generated if the actual value differs from the target value.

5. The method for the apparatus as set forth in claim 4, wherein the pressure line (14) downstream of the nonreturn valve (15) contains a switching valve (17) that can be controlled by means of the engine management system (7) and can be switched between a position in which it connects the actuating element (6) to the intake duct (8) and a position in which it supplies the actuating element (6) with ambient pressure ($p_u$).

6. The method for the apparatus as set forth in claim 5 wherein the actuating element (6) is designed as a pressure cell with an actuating diaphragm (19) that delimits a pressure chamber (18) and with an actuating rod (21), acted upon by the actuating diaphragm (19), for shutting off the bypass passage (5) and whereby a secondary air pump (24) is provided for the purpose of feeding secondary air into the exhaust line (11) directly downstream of the engine exhaust valves.

7. The method for the apparatus as set forth in claim 5 wherein the actuating element (6) is designed as a pressure cell with an actuating diaphragm (19) that delimits a pressure chamber (18) and with an actuating rod (21), acted upon by the actuating diaphragm (19), for shutting off the bypass passage (5), and wherein the actuating element (6) is designed as a two-chamber pressure cell with a pressure chamber (18) and a reference chamber (20), the pressure chamber (18) communicating with the intake pressure (p2s) in the intake manifold (10) downstream of the throttle valve (25), the reference chamber (20) communicating with the intake pressure (p2) upstream of a charge-air cooler (22) in the intake duct (8) and wherein a secondary air pump (24) is provided for the purpose of feeding secondary air into the exhaust line (11) directly downstream of the engine exhaust valves.

8. The method for the apparatus as set forth in claim 5 wherein the actuating element (6) is designed as a pressure cell with an actuating diaphragm (19) that delimits a pressure chamber (18) and with an actuating rod (21), acted upon by the actuating diaphragm (19), for shutting off the bypass passage (5), and wherein the actuating element (6) is designed as a two-chamber pressure cell with a pressure chamber (18) and a reference chamber (20), the pressure chamber (18) communicating with the intake pressure ($p_{2s}$) in the intake manifold (10) downstream of the throttle valve (25), the reference chamber (20) communicating with the intake pressure ($p_2$) upstream of a charge-air cooler (22) in the intake duct (8) and wherein a secondary air pump (24) is provided for the purpose of feeding secondary air into the exhaust line (11) directly downstream of the engine exhaust valves.

9. The method for the apparatus as set forth in claim 4, wherein the actuating element (6) is designed as a pressure cell with an actuating diaphragm (19) that delimits a pressure chamber (18) and with an actuating rod 21), acted upon by the actuating diaphragm (19), for shutting off the bypass passage (5).

10. The method for the apparatus as set forth in claim 9, wherein the actuating element (6) is designed as a single-chamber pressure cell, the pressure chamber (18) of which communicates via a switching valve (23) either with the intake pressure ($p_2$) upstream of the charge-air cooler (22) or with the intake pressure ($p_{2s}$) in the intake manifold (10).

11. The method for the apparatus as set forth in claim 4, wherein a secondary air pump (24) is provided for the purpose of feeding secondary air into the exhaust line (11) directly downstream of the engine exhaust valves.

12. The method for the apparatus as set forth in claim 4 wherein the actuating element (6) is designed as a pressure cell with an actuating diaphragm (19) that delimits a pressure chamber (18) and with an actuating rod (21), acted upon by the actuating diaphragm (19), for shutting off the bypass passage (5) and whereby a secondary air pump (24) is provided for the purpose of feeding secondary air into the exhaust line (11) directly downstream of the engine exhaust valves.

13. The method for the apparatus as set forth in claim 12, wherein a supplementary air line (13) from the secondary air pump (24) to the exhaust line (11) is provided, the supplementary air line containing a switching valve (12) to which the intake pressure ($p_{2s}$) can be supplied as the switching pressure.

14. The method for the apparatus as set forth in claim 4 wherein the actuating element (6) is designed as a pressure cell with an actuating diaphragm (19) that delimits a pressure chamber (18) and with an actuating rod (21), acted upon by the actuating diaphragm (19), for shutting off the bypass passage (5), and wherein the actuating element (6) is designed as a two-chamber pressure cell with a pressure chamber (18) and a reference chamber (20), the pressure chamber (18) communicating with the intake pressure (p2s) in the intake manifold (10) downstream of the throttle valve (25), the reference chamber (20) communicating with the intake pressure (p2) upstream of a charge-air cooler (22) in the intake duct (8) and wherein a secondary air pump (24) is provided for the purpose of feeding secondary air into the exhaust line (11) directly downstream of the engine exhaust valves.

15. The method for the apparatus as set forth in claim 4 wherein the actuating element (6) is designed as a pressure cell with an actuating diaphragm (19) that delimits a pressure chamber (18) and with an actuating rod (21), acted upon by the actuating diaphragm (19), for shutting off the bypass passage (5), and wherein the actuating element (6) is designed as a two-chamber pressure cell with a pressure chamber (18) and a reference chamber (20), the pressure chamber (18) communicating with the intake pressure ($p_{2s}$) in the intake manifold (10) downstream of the throttle valve (25), the reference chamber (20) communicating with the intake pressure ($p_2$) upstream of a charge-air cooler (22) in the intake duct (8) and wherein a secondary air pump (24) is provided for the purpose of feeding secondary air into the exhaust line (11) directly downstream of the engine exhaust valves.

* * * * *